United States Patent
Ferreol et al.

(10) Patent No.: US 8,669,901 B2
(45) Date of Patent: Mar. 11, 2014

(54) METHOD FOR DETERMINING AZIMUTH AND ELEVATION ANGLES OF ARRIVAL OF COHERENT SOURCES

(75) Inventors: Anne Ferreol, Colombes (FR); Jeremy Brugier, Paris (FR); Philippe Morgand, Athis-Mons (FR)

(73) Assignee: Thales, Neuilly sur Seine (FR)

( * ) Notice: Subject to any disclaimer, the term of this patent is extended or adjusted under 35 U.S.C. 154(b) by 248 days.

(21) Appl. No.: 13/141,968

(22) PCT Filed: Nov. 23, 2009

(86) PCT No.: PCT/EP2009/065663
§ 371 (c)(1),
(2), (4) Date: Nov. 16, 2011

(87) PCT Pub. No.: WO2010/072494
PCT Pub. Date: Jul. 1, 2010

(65) Prior Publication Data
US 2012/0098703 A1    Apr. 26, 2012

(30) Foreign Application Priority Data
Dec. 23, 2008 (FR) ...................................... 08 07404

(51) Int. Cl.
*G01S 1/08* (2006.01)
(52) U.S. Cl.
USPC ........................................................ 342/386
(58) Field of Classification Search
USPC ........................................................ 342/386
See application file for complete search history.

(56) References Cited

U.S. PATENT DOCUMENTS

2010/0063397 A1* 3/2010 Wagner ........................ 600/459

FOREIGN PATENT DOCUMENTS

FR    2 872 350 A1    12/2005
FR    2 917 180 A1    12/2008

OTHER PUBLICATIONS

S. Unnikrishna Pillai, et al., "Forward/Backward Spatial Smoothing Techniques for Coherent Signal Identification", IEEE Transactions on Acoustics, Speech, and Signal Processing, Jan. 1, 1989, pp. 8-15, vol. 37, No. 1, IEEE Inc., New York, NY, US, XP000992947.
A. Ferreol, et al., "Low-Cost Algorithm for Some Bearing Estimation Methods in Presence of Separable Nuisance Parameters", Electronics Letters, Jul. 22, 23004, pp. 966-967, vol. 40, No. 15, IEE Stevenage, GB, XP006022397.

* cited by examiner

*Primary Examiner* — Harry Liu
(74) *Attorney, Agent, or Firm* — Baker & Hostetler LLP

(57) ABSTRACT

A method for jointly determining the azimuth angle θ and the elevation angle Δ of the wave vectors of P waves in a system comprising an array of sensors, a number of waves out of the P waves being propagated along coherent or substantially coherent paths between a source and said sensors, includes at least the following steps: selecting a subset of sensors from said sensors to form a linear subarray of sensors; applying, to the signals from the chosen subarray, an algorithm according to a single dimension to decorrelate the sources of the P waves; determining a first component w of said wave vectors by applying, to the signals observed on the sensors of the chosen subarray, a goniometry algorithm according to the single dimension w; determining a second component u of said wave vectors by applying a goniometry algorithm according to the single dimension u to the signals from the entire array of sensors; determining θ and Δ from w and u.

10 Claims, 6 Drawing Sheets

METHOD FOR DETERMINING AZIMUTH AND ELEVATION ANGLES OF ARRIVAL OF COHERENT SOURCES

CROSS-REFERENCE TO RELATED APPLICATIONS

This application is a National Stage of International patent application PCT/EP2009/065663, filed on Nov. 23, 2009, which claims priority to foreign French patent application No. FR 0807404, filed on Dec. 23, 2008, the disclosures of which are incorporated by reference in their entirety.

FIELD OF THE INVENTION

The present invention relates to a method for determining azimuth and elevation angles of arrival of coherent sources. It is used, for example, in all locating systems in an urban context in which the propagation channel is disturbed by a large number of obstacles such as buildings. Generally, it can be used to locate transmitters, for example a cell phone, in a difficult propagation context, whether it be an urban environment, a semi-urban environment—for example an airport site—, the interior of a building or under snow, in the case of an avalanche. The invention can also be used in medical imaging methods, to locate tumors or sources of epilepsy, the tissues of the human body being the origin of multiple wave paths. It also applies to sounding systems for mining and oil surveys in the seismic domain, in which the aim is to estimate angles of arrival with multiple paths in the complex propagation medium of the earth's crust.

The invention is situated in the technical field of antenna processing which processes the signals from a number of transmitting sources based on a multiple-sensor reception system. More specifically, the invention relates to the field of goniometry which consists in estimating the angles of arrival of the sources.

BACKGROUND

In an electromagnetic context, the sensors are antennas and the radiofrequency sources are propagated according to a polarization that is dependent on the transmitting antenna. In an acoustic context, the sensors are microphones and the sources are sounds.

FIG. 1 shows that an antenna processing system comprises an array 102 of sensors receiving sources with different angles of arrival $\theta_{mp}$. The individual sensors 101 of the array receive the sources E1, E2 with a phase and an amplitude that are dependent in particular on their angles of incidence and on the position of the sensors. The angles of incidence are parameterized in one dimension (1D) by the azimuth $\theta_m$ and in two dimensions (2D) by the azimuth $\theta_m$ and the elevation $\Delta_m$.

According to FIG. 2, a 1D goniometry is defined by techniques which estimate only the azimuth by assuming that the waves of the sources are propagated in the plane 201 of the array of sensors. When the goniometry technique jointly estimates the azimuth and elevation of a source, it is an issue of 2D goniometry.

The aim of the antenna processing techniques is notably to exploit the spatial diversity generated by the multiple-antenna reception of the incidence signals, in other words, to use the position of the antennas of the array to better use the differences in incidence and distance of the sources.

FIG. 3 illustrates an application to goniometry in the presence of multiple paths. The m-th source 301 is propagated along P paths 311, 312, 313 of incidences $\theta_{mp}$ ($1 \leq p \leq P$) which are provoked by P-1 obstacles 320 in the radiofrequency environment. The problem dealt with in the method according to the invention is, notably, to perform a 2D goniometry for coherent paths in which the propagation time deviation between the direct path and a secondary path is very low.

One known method for doing the goniometry is the MUSIC algorithm [1]. However, this algorithm does not make it possible to estimate the incidences of the sources in the presence of coherent paths.

The algorithms that make it possible to process the case of coherent sources are the maximum likelihood algorithms [2] [3] which are applicable to arrays of sensors with any geometry. However, these techniques require the calculation of a multidimensional criteria of which the number of dimensions depends on the number of paths and on the number of incidence parameters for each path. More particularly, in the presence of K paths, the criterion has 2K dimensions for a 2D goniometry in order to jointly estimate all the incidences $(\Theta_1, \ldots, \Theta_K)$. It should be noted that, even in the presence of a number K' of coherent paths that is less than the total number K of paths, the calculation of the maximum likelihood criterion still has 2K dimensions. In order to reduce the number of dimensions of the criterion to 2K', one alternative is to apply the coherent MUSIC method [4]. However, the coherent MUSIC algorithm [4] requires a high number of sensors and very significant computation resources.

Another alternative for reducing the computation cost is to implement spatial smoothing or forward-backward techniques [5][6], these techniques requiring particular array geometries. In practice, spatial smoothing is applicable when the array is broken down into subarrays having the same geometry (e.g.: evenly-spaced linear array or array on a regular 2D grid). The forward-backward algorithm requires an array with a center of symmetry. These techniques are highly restrictive in terms of geometry of the array of sensors, especially for a 2D goniometry, in which the constraint of symmetry or of translated identical subarrays is difficult to satisfy.

For 1D goniometry, spatial smoothing techniques have been considered on any arrays [6][7]. For this, the array of sensors is interpolated according to the goniometry adapted to spatial smoothing (or forward-backward). In [6] the interpolation technique addresses only a single angular segment and in [7] the algorithm is adapted to the cases of a number of angular segments for the interpolation. However, this kind of technique is difficult to adapt to the case of 2D goniometry.

SUMMARY OF THE INVENTION

One aim of the invention is to propose a method for determining, from an array of sensors, the direction of arrival in azimuth and elevation of coherent signals with a reduced computation cost and by limiting as far as possible the geometrical constraints to be imposed on the array of sensors. To this end, the subject of the invention is a method for jointly determining the azimuth angle $\theta$ and the elevation angle $\Delta$ of the wave vectors of P waves in a system comprising an array of sensors, a number of waves out of the P waves being propagated along coherent or substantially coherent paths between a source and said sensors, the method being characterized in that it comprises at least the following steps:

selecting a subset of sensors from said sensors to form a linear subarray of sensors;

applying, to the signals from the chosen subarray, an algorithm according to a single dimension to decorrelate the sources of the P waves;

determining a first component w of said wave vectors by applying, to the signals observed on the sensors of the chosen subarray, a goniometry algorithm according to the single dimension w;

determining a second component u of said wave vectors by applying a goniometry algorithm according to the single dimension u to the signals from the entire array of sensors;

determining θ and Δ from w and u.

The method according to the invention makes it possible to reduce the complexity of a two-dimensional goniometry problem by dividing it into two phases with a single dimension: a first phase for estimating a projection value w of the wave vector, then a phase for estimating a value of the other component u of the wave vector.

According to one implementation of the method according to the invention, the sensors forming the subarray are chosen such that at least a portion of the subarray is unchanging by translation;

a spatial smoothing algorithm is applied to decorrelate the sources of the P waves.

The expression "unchanging by translation" should be understood to mean that there is at least one subset of the subarray whose sensors are arranged as if they were the result of a translation of another subset of sensors of said subarray.

According to one implementation of the method according to the invention, the sensors forming the subarray are chosen such that at least a portion of the subarray includes a center of symmetry;

a forward-backward algorithm is applied to decorrelate the sources of the P waves.

The expression "center of symmetry of the subarray" should be understood to mean that, for each sensor, there is a sensor placed symmetrically relative to said center.

According to one implementation of the method according to the invention, the determined first component w of the wave vectors is the projection, on the axis formed by the linear subarray, of the projection of the wave vectors on the plane formed by the array of sensors. In other words, for each path p, $w_p = \cos(\theta_p - \alpha) \cdot \cos(\Delta_p)$, α being the azimuth angle according to which the axis formed by the linear subarray is oriented.

According to one implementation of the method according to the invention, the method includes at least the following steps:

calculating the covariance matrix $R_x$ on the entire array of sensors;

extracting from $R_x$, the covariance matrix $R_x'$ corresponding to the chosen linear subarray;

applying a source decorrelation algorithm to $R_x'$;

estimating, for each path p, the values of the first component $w_p = \cos(\theta_p - \alpha) \cdot \cos(\Delta_p)$ by applying a 1D goniometry algorithm to the decorrelated matrix $R_x'$, α being the azimuth orientation angle of the axis formed by the linear subarray;

estimating the values of the second component $u_p = \cos(\theta_p) \cdot \cos(\Delta_p)$, for each path p, by applying a 1D goniometry algorithm to the matrix $R_x$;

determining, from the values of the pairs $(w_p, u_p)$, the values of the azimuth-elevation pairs $(\theta_p, \Delta_p)$.

According to one implementation of the method according to the invention, the goniometry algorithm used to determine the first component w of each wave vector P is the MUSIC algorithm, the criterion $J_{MUSIC}$ to be minimized to determine said component w being equal to $$J_{MUSIC}(w) = \frac{a^l(w)^H \Pi_b^l a^l(w)}{a^l(w)^H a^l(w)},$$

in which $\Pi_b^l$ is the noise projector extracted from the decorrelated covariance matrix $R_x'$ corresponding to the chosen linear subarray, and $a(w)^l$ represents the response of the chosen subarray to the incident waves P.

According to one implementation of the method according to the invention, the goniometry algorithm used to determine the second component u is the coherent MUSIC algorithm in a single dimension, the criterion to be minimized being:

$$J_{coherent\ MUSIC}(\underline{\Theta}) = \frac{\det(D(\underline{\Theta})^H \Pi_b D(\underline{\Theta}))}{\det(D(\underline{\Theta})^H D(\underline{\Theta}))}$$

in which $\underline{\Theta} = \{f_1(u_1) \ldots f_{K_{max}}(u_{K_{max}})\}$, with $$f_p(u) = f\left(u, \frac{w_p - u\cos(\alpha)}{\sin(\alpha)}\right),$$

α being the azimuth orientation angle of the axis formed by the linear subarray, $D(\underline{\Theta})$ being a vector equal to $[a(\underline{\Theta}_1) \ldots a(\underline{\Theta}_{Kmax})]$, $a(\underline{\Theta}_i)$ being the response of the array of sensors to the path of index i, $K_{max}$ being the maximum number of coherent paths.

According to one implementation of the method according to the invention, the goniometry algorithm used to determine the second component is the maximum likelihood algorithm.

According to one implementation of the method according to the invention, the array is disturbed by mutual coupling of known matrix Z, and the method includes a step for eliminating the coupling executed prior to the steps for estimating the values of the components w and u, said step for eliminating the coupling determining a covariance matrix that is cleaned of noise by applying the following processing to the covariance matrix: $Z^{-1}(R_x - \sigma^2 I)Z^{-1H}$, $\sigma^2$ being the estimated noise level.

According to one implementation of the method according to the invention, the determination of the pairs of values $(\theta_p, \Delta_p)$ from the values of pairs $(w_p, u_p)$ is performed as follows:

$$\begin{cases} \theta_p = \text{angle}(u_p + jv_p) \\ \Delta_p = \cos^{-1}(|u_p + jv_p|) \end{cases}$$

in which $$v_p = \frac{w_p - u_p \cos(\alpha)}{\sin(\alpha)}.$$

BRIEF DESCRIPTION OF THE DRAWINGS

Other characteristics will emerge from reading the following detailed description given as a nonlimiting example and in light of the appended drawings which represent.

DETAILED DESCRIPTION

Before detailing an exemplary implementation of the method according to the invention, some reminders concerning the modeling of the output signal from an array of sensors are given.

Figure 1:
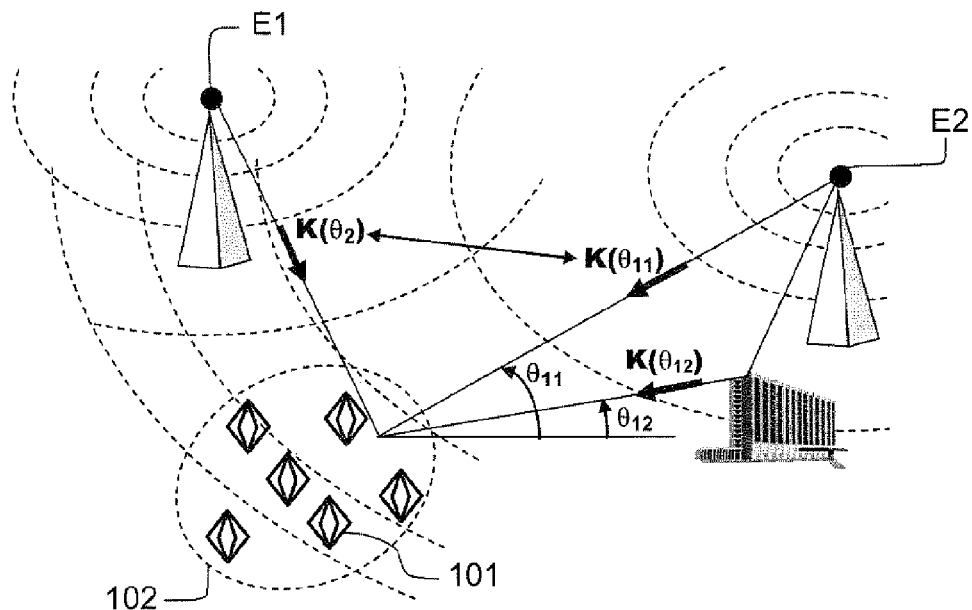
FIG. 1, an example of signals transmitted by a transmitter and being propagated to an array of sensors, FIG. 2, the representation of the incidence of a source on a plane of sensors, FIG. 3, an illustration of the propagation of signals by multiple paths, FIG. 4, an example of arrays of sensors of position $(x_n, y_n)$, FIG. 5, an example of an array of sensors consisting of two subarrays that are unchanging by translation, FIG. 6, an example of an array of sensors consisting of two subarrays making it possible to decorrelate two paths that are coherent in azimuth and elevation, FIG. 7, a linear array of sensors in which the spatial smoothing makes it possible to decorrelate two paths that are coherent in azimuth, FIG. 8, an array of sensors having a center of symmetry at O, FIG. 9, two linear arrays with five sensors, making it possible to decorrelate two paths that are coherent in azimuth for, respectively, spatial smoothing and forward-backward, FIG. 10, a first example of an array of sensors containing a linear subarray of sensors and compatible with the method according to the invention, FIG. 11, a second example of an array of sensors containing a linear subarray of sensors and compatible with the method according to the invention.
Figure 2:
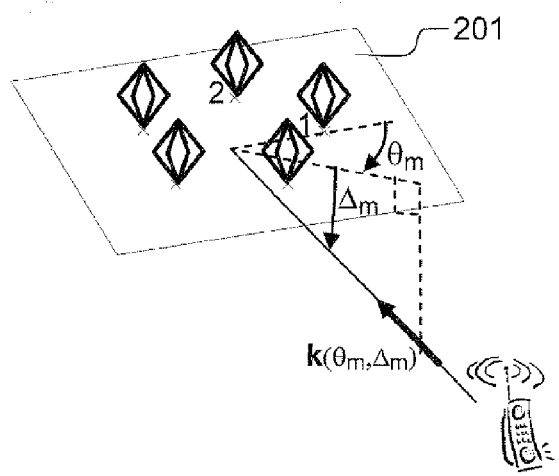
Figure 3:
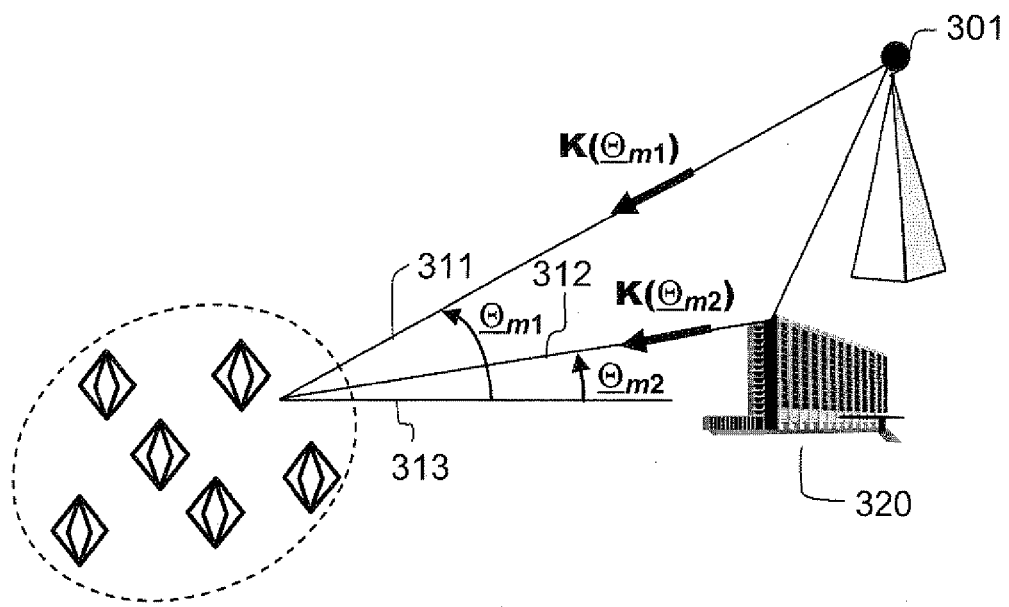
Figure 4:
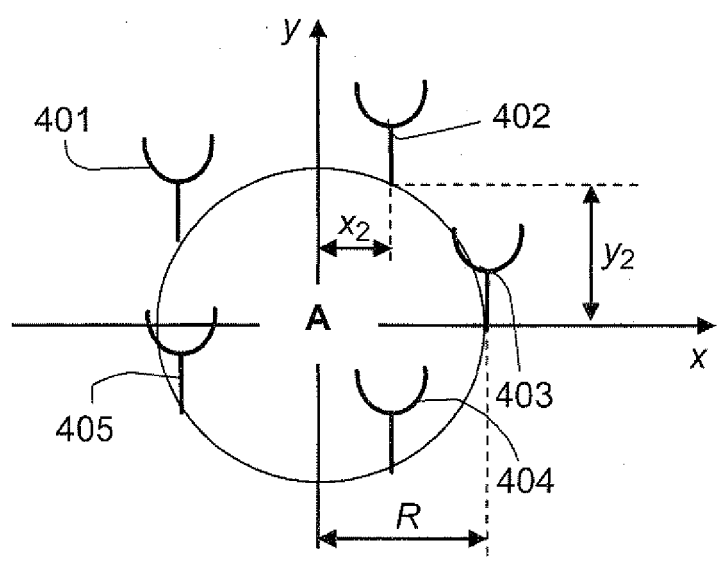

With M sources in which the m-th source contains $P_m$ multiple paths, the output signal from the array of sensors is written as follows:

$$x(t) = \begin{bmatrix} x_1(t) \\ \vdots \\ x_N(t) \end{bmatrix} = \sum_{m=1}^{M} \sum_{p=1}^{P_m} \rho_{mp} a(\underline{\Theta}_{mp}) s_m(t - \tau_{mp}) + n(t). \quad (1)$$

in which $x_n(t)$ is the signal at the output of the n-th sensor, N the number of sensors, $n(t)$ is the additive noise, $a(\Theta)$ is the response of the array of sensors to a source of direction $\underline{\Theta}=(\theta, \Delta)$, $\theta$ is the azimuth, $\Delta$ the elevation and $\rho_{mp}, \theta_{mp}, \tau_{mp}$ are respectively the attenuation, the direction and the delay of the p-th paths of the m-th source. The vector $a(\Theta)$ which is also called directing vector depends on the positions $(x_n, y_n)$ of the sensors 401, 402, 403, 404, 405 (see FIG. 4) and is written $$a(\Theta) = Z \begin{bmatrix} a_1(\Theta) \\ \vdots \\ a_N(\Theta) \end{bmatrix} \text{ with } \begin{cases} a_n(\Theta) = \exp\left(j\frac{2\pi}{\lambda}(x_n u + y_n v)\right) \\ u = \cos(\theta)\cos(\Delta) \\ v = \sin(\theta)\cos(\Delta). \end{cases} \quad (2)$$

in which Z is the coupling matrix, $\lambda$ is the wavelength and $(u,v)$ are the coordinates of the wave vector in the plane of the antenna.

With coherent paths in which the delays of the paths satisfy $\tau_{m1} = \ldots = \tau_{mPm}$, the signal model of the equation (1) becomes $$x(t) = \sum_{m=1}^{M} a(\underline{\Theta}_m, \rho_m, P_m) s_m(t) + n(t) \quad (3)$$

with $$a(\underline{\Theta}_m, \rho_m, P_m) = \sum_{p=1}^{P_m} \rho_{mp} a(\underline{\Theta}_{mp}).$$

in which $a(\underline{\Theta}_m, \rho_m, P_m)$ is the response of the array of sensors to the m-th source, $\underline{\Theta}_m = [\underline{\Theta}_{m1} \ldots \underline{\Theta}_{mP_m}]^T$ and $\rho_m = [\rho_{m1} \ldots \rho_{mP_m}]^T$. The directing vector of the source is no longer $a(\underline{\Theta}_{m1})$ but a composite directing vector $a(\underline{\Theta}_m, \rho_m, P_m)$ dependant on a greater number of parameters.

More generally, with K groups of coherent paths, the signal is written:

$$x(t) = \sum_{k=1}^{K} a(\underline{\Theta}_k, \rho_k, K_k) s_k(t) + n(t) \quad (4)$$

in which $$K_{max} = \max_k \{K_k\}.$$

To enable the reader to better understand the method according to the invention, the processing of the coherent sources in azimuth and elevation in the state of the art is explained hereinbelow.

A first coherent MUSIC algorithm [4] is first described. The MUSIC algorithm [1] is a high-resolution method based on the breakdown into specific elements of the covariance matrix $R_x = E[x(t)x(t)^H]$ of the multiple-sensor signal $x(t)$, in which $E[.]$ is the mathematical expectation. The expression of the matrix $R_X$ is as follows according to (4):

$$R_x = AR_s A^H + \sigma^2 I_N \quad (5)$$

with $\begin{cases} R_s = E[s(t)s(t)^H] \\ E[n(t)n(t)^H] = \sigma^2 I_N \\ A = [a(\underline{\Theta}_1, \rho_1, K_1) \ldots a(\underline{\Theta}_k, \rho_k, K_k)] \\ s(t) = [s_1(t) \ldots s_K(t)]^T. \end{cases}$ With K groups of coherent paths, the rank of the matrix $R_x$ is K. In these conditions, the K specific vectors $e_k$ ($1 \leq k \leq K$) associated with the K highest specific values $\lambda_k$ of $R_x$ satisfy $$e_k = \sum_{i=1}^{K} \alpha_{ik} a(\underline{\Theta}_i, \rho_i, K_i) \text{ for } (1 \leq k \leq K). \quad (6)$$

The N-K specific vectors $e_l$ ($K+1 \leq l \leq N$) associated with the lowest specific values of $R_x$ are orthogonal to the vectors $e_k$ ($1 \leq k \leq K$) of the expression (6) and define the noise space. Since the vectors $e_l$ and $e_k$ are orthogonal, the directing vectors $a(\underline{\Theta}_i, \rho_i, K_i)$ are orthogonal to the noise vectors $e_l$. In these conditions, the K minima $(\underline{\Theta}_k, \rho_k, K_k)$ of the following MUSIC criterion $$J_{MUSIC}(\underline{\Theta}, \rho) = \frac{a(\underline{\Theta}, \rho, K_{max})^H \Pi_b a(\underline{\Theta}, \rho, K_{max})}{a(\underline{\Theta}, \rho, K_{max})^H a(\underline{\Theta}, \rho, K_{max})} \quad (7)$$

$$\text{with } \Pi_b = \sum_{i=K+1}^{N} e_i e_i^H.$$

make it possible to give the directions $\underline{\Theta}_k$ of each path. However, the cost of calculating the criterion of the equation (7) is very high because it depends on the incidence of $K_{max}$ coherent paths and their relative amplitudes: $(\underline{\Theta}, \rho)$.

The coherent MUSIC method described in [4] is designed to reduce the number of parameters for searching for the MUSIC criterion. For this, the vector $a(\underline{\Theta}_m, \rho_m, P_m)$ of equation (3) is rewritten as follows:

$$a(\underline{\Theta}, \rho, K_{max}) = D(\underline{\Theta})\rho \quad (8)$$

$$\text{with } \begin{cases} D(\underline{\Theta}) = [a(\underline{\Theta}_1) \ldots a(\underline{\Theta}_{K_{max}})] \\ \rho = [\rho_1 \ldots \rho_{K_{max}}]^T \\ \underline{\Theta} = \{\underline{\Theta}_1 \ldots \underline{\Theta}_{K_{max}}\}. \end{cases}$$

In these conditions, the criterion of equation (7) is reduced to the following expression:

$$J_{coherent\ MUSIC}(\underline{\Theta}) = \frac{\det(D(\underline{\Theta})^H \Pi_b D(\underline{\Theta}))}{\det(D(\underline{\Theta})^H D(\underline{\Theta}))}. \quad (9)$$

in which det(M) is the determinant of the matrix M. The number of dimensions of the criterion is then reduced to $2K_{max}$ parameters of $\underline{\Theta}$ in which $K_{max}$ is the maximum number of coherent paths. Consequently, the K minima of the criterion $J_{MUSIC-Coherent}(\underline{\Theta})$ gives the directions $\underline{\Theta}_k = \{\underline{\Theta}_{k1} \ldots \underline{\Theta}_{kK_{max}}\}$ of the paths of each group of coherent paths for $1 \le k \le K$. Thus, with $K_{max} = 2$ coherent paths, the coherent MUSIC criterion still has four dimensions for an azimuth-elevation goniometry. More generally, the coherent MUSIC method entails calculating a criterion (9) having $2K_{max}$ dimensions. However, the method makes no assumption as to the geometry of the array because it entails no constraint on the expression of the directing vector $a(\underline{\Theta})$.

Alternative methods that are also known for processing coherent sources are the spatial smoothing [5][6] and forward-backward [5] techniques. These methods make it possible to decorrelate the sources by performing a simple pre-processing on the covariance matrix of the received signals. It is then possible to apply a goniometry algorithm such as MUSIC to the new covariance matrix. These techniques derive from the field of spectral analysis whose objective is to model the frequency spectrum of a signal.

Figure 5:
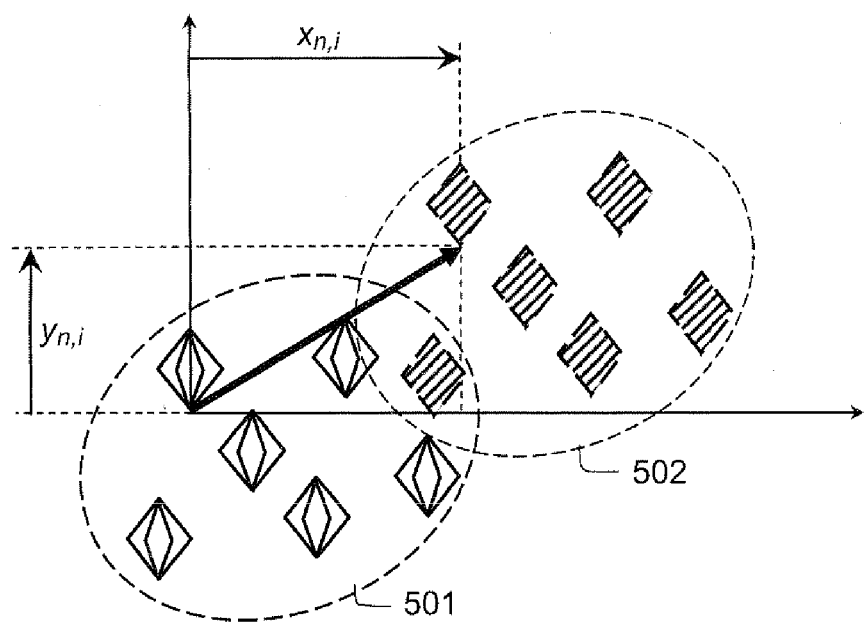

The spatial smoothing techniques [5][6] are applicable to an array of sensors consisting of subarrays 501, 502 that are unchanging by translation as illustrated in FIG. 5. With P paths (coherent or not), the expression (1) of the observation vector can be rewritten $$x(t) = \sum_{p=1}^{P} \rho_p a(\underline{\Theta}_p) s_p(t) + n(t) = As(t) + n(t) \quad (10)$$

with $A = [a(\underline{\Theta}_1) \ldots a(\underline{\Theta}_P)]$.

The expression of the signal received on the i-th subarray is then written:

$$x^i(t) = P^i x(t) = \sum_{p=1}^{P} \rho_p a^i(\underline{\Theta}_p) s_p(t) + n(t) = A^i s(t) + n(t) \quad (11)$$

in which $A^i = [a^i(\underline{\Theta}_1) \ldots a^i(\underline{\Theta}_P)]$, $P^i$ being a matrix consisting of 0 and 1 making it possible to select the signal of the i-th subarray for which the directing vector $a^i(\underline{\Theta})$ satisfies the following relationship:

$$a^i(\underline{\Theta}) = P^i a(\underline{\Theta}) = \alpha^i(\underline{\Theta}) a^1(\underline{\Theta}) \quad (12)$$

Remembering that the incidence $\underline{\Theta} = (\theta, \Delta)$ depends on the two parameters $\theta$ and $\Delta$.

According to (11)(12), the mixing matrix $A^i$ of the i-th subarray satisfies $$A^i = P^i A = A^1 \Phi_i \text{ with } \Phi_i = \text{diag}\{\alpha^i(\underline{\Theta}_1) \ldots \alpha^i(\underline{\Theta}_P)\} \quad (13)$$

According to (11)(13) the covariance matrix $R_x^i = E[x(t)^i x(t)^{iH}]$ has the following expression:

$$R_x^i = A^1 \Phi_i R_s \Phi_i^* A^{1H} + \sigma^2 I_N \text{ in which } R_s = E[s(t)s(t)^H] \quad (14)$$

Consequently, an alternative to the spatial smoothing techniques consists in applying a MUSIC-type algorithm to the following covariance matrix:

$$R_x^{SM} \sum_{i=1}^{I} R_x^i = \sum_{i=1}^{I} P^i R_x (P^i)^H \quad (15)$$

in which $R_x = E[x(t) x(t)^H]$. The aim of this procedure is to obtain a matrix $R_x^{SM}$ that has a rank higher than the $R_x^i$ without destroying the structure of the signal space generated by $A^1$. In practice, this technique makes it possible to decorrelate a maximum of I coherent paths because $$R_x^{SM} = A^1 R_s^{SM} A^{1H} + \sigma^2 I_{N'} \text{ in which} \quad (16)$$

$$R_s^{SM} = \sum_{i=1}^{I} \Phi_i R_s \Phi_i^*$$

and thus, $$\text{rank}\{R_s\} \le \text{rank}\{R_s^{SM}\} \le \min\left(\text{rank}\{R_s\}/, \sum_{m=1}^{M} P_m\right).$$

Figure 8:
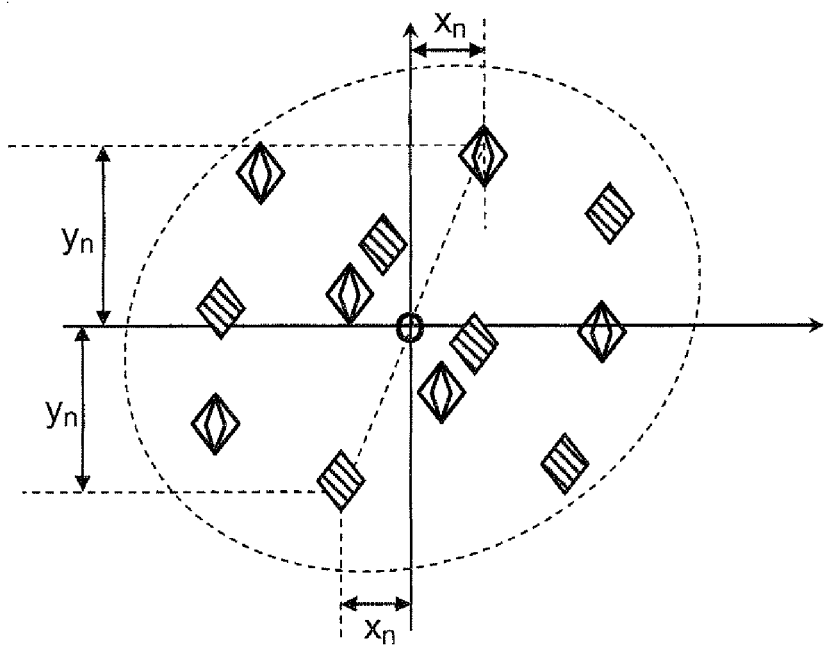

The forward-backward [5] smoothing technique requires an array of sensors that has a center of symmetry at O as indicated in FIG. 8. In these conditions, the directing vector has the following structure $$a(\underline{\Theta}) = \beta(\underline{\Theta}) \begin{bmatrix} b(\underline{\Theta}) \\ b(\underline{\Theta})^* \end{bmatrix} \quad (17)$$

in which, according to FIG. 8, $b(\underline{\Theta})$ is the directing vector of the subarray of coordinates $(x_n - x_0, y_n - y_0)$ and $b(\underline{\Theta})^*$ is the directing vector of the subarray of coordinates $(-x_n - x_0, -y_n - y_0)$, bearing in mind that $(x_0, y_0)$ are the coordinates of the center of symmetry O. Consequently, the directing vector of the expression (17) satisfies the following relationship:

$$\Pi a(\underline{\Theta})^* = \beta(\underline{\Theta})^* a(\underline{\Theta}) \quad (18)$$

in which $\Pi$ is a permutation matrix consisting of 0 and 1. The forward-backward smoothing technique consists in applying a goniometry algorithm such as MUSIC to the following covariance matrix $$R_x^{FB} = R_x + \Pi R_x^* \Pi^T \quad (19)$$

bearing in mind that $$R_x^{FB} = A R_s^{FB} A^H + \sigma^2 I_N \text{ in which } R_s^{FB} = R_s + \Phi_{FB} R_s \Phi_{FB}^* \quad (20)$$

The technique makes it possible to decorrelate two coherent paths because $$\text{rank}\{R_s\} \le \text{rank}\{R_s^{SM}\} \le \min\left(2\text{rank}\{R_s\}, \sum_{m=1}^{M} P_m\right)$$

with $$\Phi_{FB} = \text{diag}\{\beta(\underline{\Theta}_1) \ldots \beta(\underline{\Theta}_P)\} \quad (21)$$

The spatial smoothing and forward-backward techniques can be combined to increase the capacity for decorrelation into number of paths. These smoothing techniques make it possible to process the coherent sources with a computation power that is very similar to the application of a single goniometry algorithm such as MUSIC.

When the array of sensors is disturbed by mutual coupling in which the directing vector is written $$a(\underline{\Theta}) = Z \hat{a}(\underline{\Theta}) \quad (22)$$

and in which the directing vector $\hat{a}(\Theta)$ satisfies one of the properties of the equations (12)(18), the spatial smoothing techniques are applicable [7]. The mixing matrix A of the equation (10) is then written $$A = Z \hat{A} \text{ with } \hat{A} = [\hat{a}(\underline{\Theta}_1) \ldots \hat{a}(\underline{\Theta}_P)] \quad (23)$$

Consequently, the covariance matrix $R_x = E[x(t) x(t)^H]$ is written as follows:

$$R_x = Z(\hat{A} R_s \hat{A}^H) Z^H + \sigma^2 I_N \quad (24)$$

Bearing in mind that $\hat{A}^i = P^i \hat{A} = \hat{A}^1 \Phi_i$ (where that $\Pi \hat{A}^* = \hat{A} \Phi_{FB}$), the following steps make it possible to apply a spatial smoothing or forward-backward technique in the presence of mutual coupling:

Step No. L.1: Break down the covariance matrix $R_x = E[x(t) x(t)^H]$ into specific elements such that:

$$R_x = E_s \Lambda_s E_s^H + E_b \Lambda_b E_b^H \quad (25)$$

in which $E_s$ and $E_b$ are the matrices of the specific vectors respectively associated with the signal space and the noise space according to MUSIC0 and in which $\Lambda_s$ and $\Lambda_b$ are diagonal matrices respectively consisting of the specific values of the signal space and of the specific values of the noise space.

Step No. L.2: Extract the non-noise-affected covariance matrix $Z(\hat{A} R_s \hat{A}^H) Z^H$ by performing:

$$R_y = R_x - \frac{\text{trace}(\Lambda_b)}{N - K} I_N = Z(\hat{A} R_s \hat{A}^H) Z^H$$

in which K is the dimension of the signal space such that $K \le P$.

Step No. L.3 (Spatial smoothing): Apply the MUSIC algorithm to the following covariance matrix $R_x^{SM}$:

$$R_x^{SM} = \sum_{i=1}^{I} P^i (Z^{-1} R_y (Z^{-1})^H)(P^i)^H$$

Step No. L.3 (Forward-Backward): Apply the MUSIC algorithm to the following covariance matrix $R_x^{FB}$:

$$R_x^{FB} = (Z^{-1} R_y (Z^{-1})^H) + \Pi(Z^{-1} R_y (Z^{-1})^H)^* \Pi^T$$

If the directing vector array $\hat{a}(\Theta)$ permits, the two smoothing techniques of steps No. L.3 can be combined.

The spatial smoothing techniques are applicable with mutual coupling. However, this imposes very strong constraints on the geometry of the individual array which have the drawback of requiring a very large number of sensors. In the following example, we will evaluate the minimum number of sensors to process the case of two sources coherent in azimuth-elevation. For this, it is necessary for:

Constraint C1: The number of sensors of each subarray to be at least equal to $N^i = 4$. In practice, because of ambiguities, an array of N sensors makes it possible at most to estimate the direction of arrival of N/2 sources.

Constraint C2: The number of subarrays to be at least equal to 2.

Constraint C3: The subarrays to be planar (not linear) in order to be able to perform an azimuth-elevation goniometry.

Figure 6:
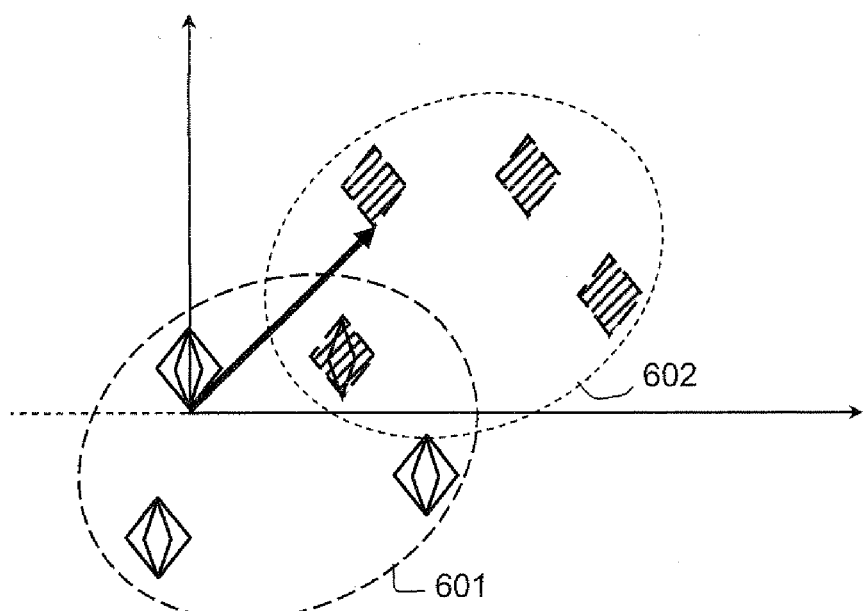
Figure 7:
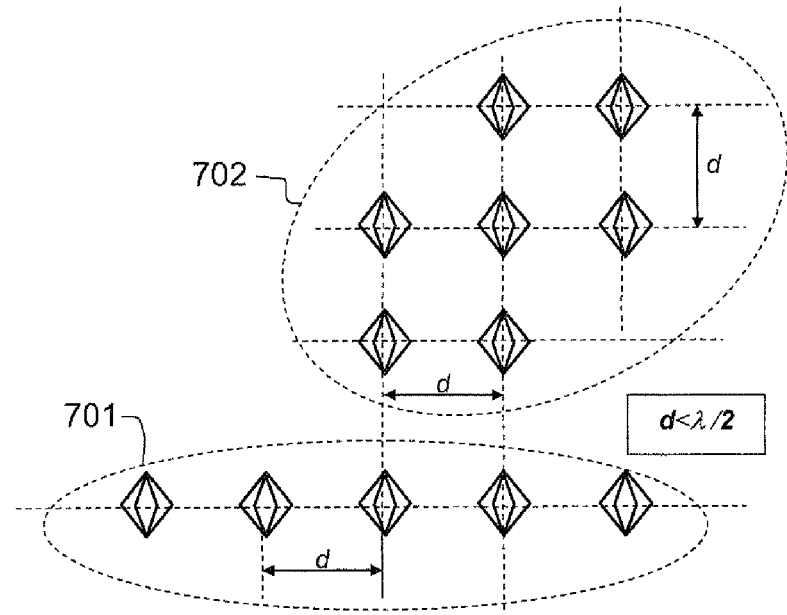

FIG. 6 shows that an array consisting of two subarrays 601, 602 of four sensors contains at least seven sensors. This array also has the drawback of being weakly open (or has little spatial bulk) because the subarrays with four sensors must be unambiguous. Since the subarrays consist of four sensors, this ambiguity constraint requires a spacing between sensors less than $\lambda/2$. In practice, the more open a array is, the more accurate the estimation of the angles of arrival is with a better robustness to calibration errors. For the case where the desire is to perform an azimuth goniometry only, the constraint C3 no longer applies and the array making it possible to perform a goniometry on two coherent sources consisting of two subarrays of four sensors is an evenly-spaced linear array with five sensors. Each subarray is then an evenly-spaced linear array with four sensors. FIG. 7 shows that the linear subarray 701 which allows for the azimuth goniometry of two coherent paths has the following differences compared to the array 702 which makes it possible to do so in azimuth and elevation: on the one hand, it consists of fewer sensors: five instead of seven, and on the other hand, it has a greater bulk: 4 d instead of 3 d, bearing in mind that d is a distance less than $\lambda/2$, $\lambda$ being the wavelength of the transmitted signals.

For the forward-backward technique requiring an array with a center of symmetry as illustrated in FIG. 8, it is possible to note that, for the spatial smoothing: the decorrelation of two coherent paths for an azimuth-elevation goniometry requires an array of sensors having more sensors and less aperture than the array making it possible to perform an azimuth goniometry only. For an azimuth goniometry, a linear array, not necessarily evenly-spaced, is sufficient.

Figure 9:
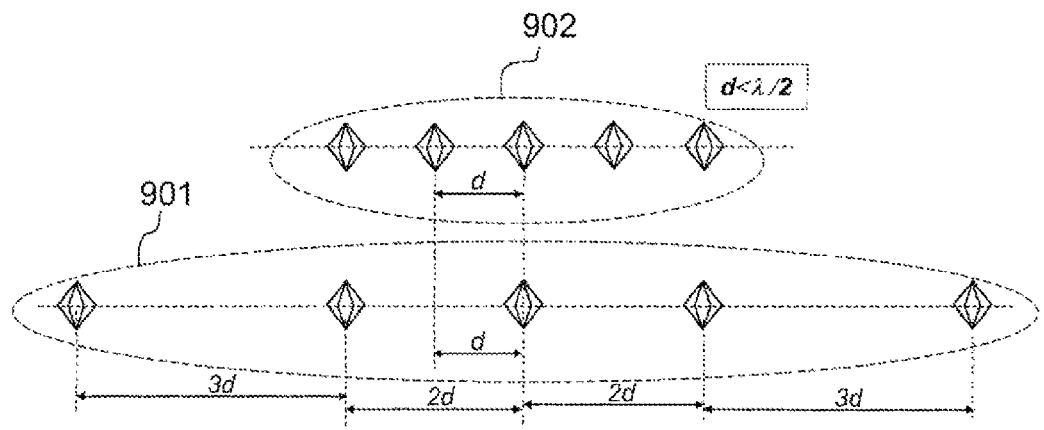

FIG. 9 shows that the forward-backward technique makes it possible, compared to the spatial smoothing technique, to perform an unambiguous goniometry on two coherent paths with an array 901 having a greater aperture (10 d instead of 4 d for an array 902 used for spatial smoothing). The forward-backward technique has the advantage of not imposing any geometry constraint on half the array. The other half of the array is symmetrical to the 1st half.

Figure 10:
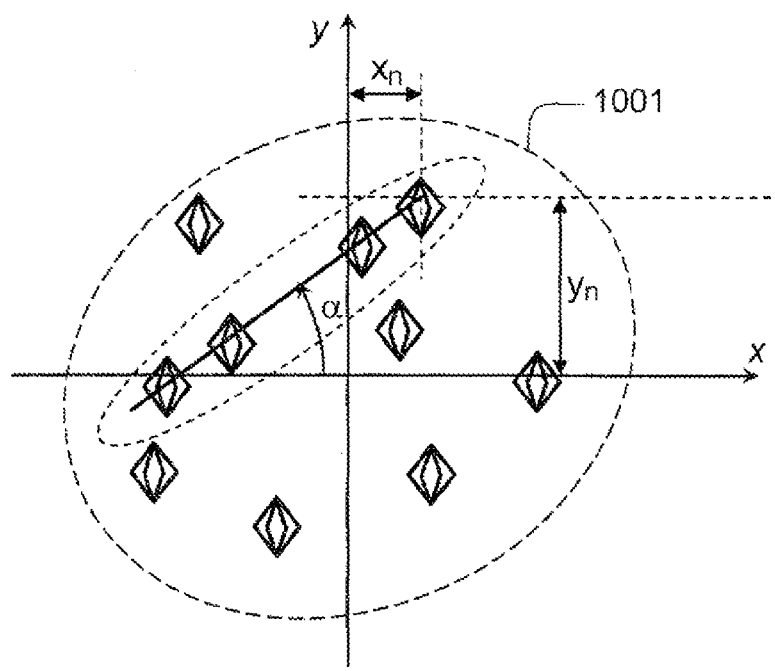
Figure 11:
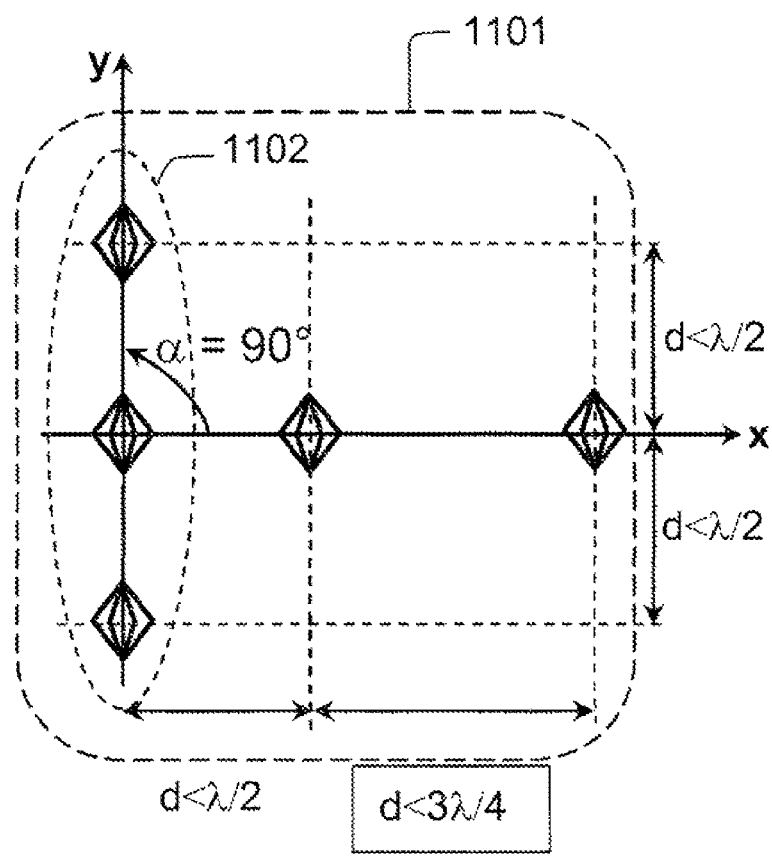

The method according to the invention described combines the coherent MUSIC method with a forward-backward technique and/or a spatial smoothing technique. Given the advantages and drawbacks of the smoothing techniques and of the coherent MUSIC algorithm described above, the method envisages using an array of sensors containing a linear subarray on which a spatial smoothing and/or forward-backward technique can be envisaged. FIG. 10 shows such an array 1001 with a linear subarray 1002 having an orientation α relative to the x axis. More specifically, the method according to the invention can use the array 1101 of FIG. 11 in which the angle α=90° and the linear subarray 1102 consists of 3 evenly-spaced sensors on which a forward-backward technique can be applied.

The coordinates $(x_n^l, y_n^l)$ of the n-th sensor of the linear subarray then have the following expression:

$$\begin{cases} x_n^l = \rho_n \cos(\alpha) \\ y_n^l = \rho_n \sin(\alpha) \end{cases} \quad (26)$$

$$\text{for } 1 \le n \le N^l$$

in which $N^l$ is the number of sensors of the linear subarray. In the absence of coupling and according to (2), the directing vector $a^l(\underline{\Theta})$ associated with the linear subarray is written $$a^l(\underline{\Theta}) = \begin{bmatrix} a_1^l(\underline{\Theta}) \\ \vdots \\ a_{N^l}^l(\underline{\Theta}) \end{bmatrix} \text{ with } a_n^l(\underline{\Theta}) = \exp\left(j2\pi\frac{\rho_n}{\lambda}\cos(\theta-\alpha)\cos(\Delta)\right) \quad (27)$$

The vector $a^l(\underline{\Theta})$ then depends on a single parameter $w=\cos(\theta-\alpha)\cos(\Delta)$ as follows:

$$a^l(\underline{\Theta}) = a^l(w) = \begin{bmatrix} z^{\rho_1} \\ \vdots \\ z^{\rho_{N^l}} \end{bmatrix} \text{ with } z = \exp\left(j\frac{2\pi}{\lambda}w\right) \quad (28)$$

$x^l(t)$ is used to denote the signal at the output of the linear subarray and $P_{roj}$ the matrix consisting of 0 and 1 that can be used to extract the signals from the linear subarray such that $$x^l(t)=P_{roj}x(t) \quad (29)$$

in which x(t) is the signal observed on all the sensors of the array. The relationship between the variable $w=\cos(\theta-\alpha)\cos(\Delta)$ and the coordinates of the wave vector (u,v) of the equation (2) is as follows:

$$w=u\cos(\alpha)+v\sin(\alpha) \quad (30)$$

Knowing w, the incidence Θ becomes a 1D function dependent on the parameter u such that:

$$\underline{\Theta}(u) = (\theta, \Delta) = f(u, v) = f\left(u, \frac{w - u\cos(\alpha)}{\sin(\alpha)}\right) \quad (31)$$

in which the function f(u,v) is given by the expression (2). When α=0, the vector of parameter Θ cannot depend on the variable u: In this case, the incidence Θ depends on the variable v with the function $\Theta(v)=f((w-v\sin(\alpha))/\cos(\alpha),v)$. In the interests of simplicity in the description of the method and without compromising generality, it will be assumed that it is still possible to write Θ as a function of u. Consequently, $$\underline{\Theta}_p = f_p(u_p) \text{ with } f_p(u) = f\left(u, \frac{w_p - u\cos(\alpha)}{\sin(\alpha)}\right) \quad (32)$$

With P paths of which at least one group of $K_{max}$ are coherent, the example described of the method according to the invention contains at least the following steps:

Step A: Application of a spatial smoothing and/or forward-backward technique to the observation vector $x^l(t)$ of the linear array. After a 1D goniometry according to the variable w, the incidence parameters $w_p=\cos(\theta_p-\alpha)\cos(\Delta_p)$ are obtained for (1≤p≤P). The 1D MUSIC criterion has the following expression:

$$J_{MUSIC}(w) = \frac{a^l(w)^H \Pi_b^l a^l(w)}{a^l(w)^H a^l(w)} \quad (33)$$

in which $\Pi_b^l$ is the noise projector extracted from the smoothed covariance matrix.

Step B: With $K_{max}\le P$ coherent paths, application of the coherent MUSIC method described above with the variable $\underline{\Theta}=\{\underline{\Theta}_1 \ldots \underline{\Theta}_{K_{max}}\}$ which is the following function of the variable $\underline{u}=\{u_1 \ldots u_{K_{max}}\}$ $$\underline{\Theta}=\{f_1(u_1) \ldots f_{K_{max}}(u_{K_{max}})\} \quad (34)$$

in which the coherent MUSIC criterion $J_{coherent\ MUSIC}$ is a function of the variable u having $K_{max}$ dimensions.

Step C: from K (K being the rank of the covariance matrix $R_x$) solutions $\underline{u}_k$ minimizing the function $J_{coherent\ MUSIC}(\underline{u})$ it is possible to extract the P pairs of incidences $(w_p,u_p)$ for (1≤p≤P) and deduce the incidences $(\theta_p,\Delta_p)$ therefrom by performing $$\begin{cases} \theta_p = \text{angle}(u_p + jv_p) \\ \Delta_p = \cos^{-1}(|u_p + jv_p|) \end{cases} \text{ in which } v_p = \frac{w_p - u_p\cos(\alpha)}{\sin(\alpha)} \quad (35)$$

The preceding steps show that the calculation of a criterion with $2K_{max}$ dimensions for the coherent MUSIC algorithm alone in 2D has been replaced by the calculation of a MUSIC criterion with one dimension according to the parameter w and the cost of calculation of the 1D coherent MUSIC criterion with the variable u having $K_{max}$ dimensions. The gain in computation power is then equal to $$\text{Gain} = \frac{nb^{(2K_{max}-1)}}{1 + nb^{(K_{max}-1)}} \approx nb^{K_{max}} \quad (36)$$

in which nb is the number of points of the meshes of the criteria (MUSIC or coherent MUSIC) according to the variables u and v of the components of the wave vector. In the general case nb is large while being proportional to the size of the array (nb>50).

It will be assumed that $\underline{u}_k$ is a solution parameter vector for coherent MUSIC when $$J_{coherent\ MUSIC}(\underline{u}_k)<\eta(K_{max}) \quad (37)$$

in which $\eta(K_{max})$ is a threshold between 0 and 1 because the criterion $J_{coherent\ MUSIC}(\underline{u})$ is normalized. When the number K' of solutions $u_k$ is less than the rank K of the covariance matrix $R_x$, it can be deduced therefrom that the number of coherent paths is greater than $K_{max}$. For the case where $K'<K_{max}$ the coherent MUSIC algorithm will be applied with $K_{max}=K_{max}+1$. Consequently, the method makes it possible to jointly estimate the incidences of the paths with the number of coherent paths.

Similarly, it will be assumed that $w_p$ is a solution parameter of the 1D goniometry of step A when $$J_{MUSIC}(w_p)<\eta \quad (38)$$

In which $\eta$ is a threshold between 0 and 1 because the criterion $J_{MUSIC}(w)$ is normalized.

The method envisages treating the case in which at least two coherent paths satisfy $w_i=w_j$ with $u_i \neq u_j$. This problem can be detected when:

the rank of the smoothed covariance matrix remains equal to that of the covariance matrix Rx;
the MUSIC method does not work on the non-smoothed covariance matrix Rx.

By assuming that there are $K_{max}$ coherent paths and that 1D MUSIC w gives P'$<K_{max}$ coherent path solutions, the method consists in complementing the incomplete list of P' elements $\{w_p\}$ with $K_{max}$, $-$P' estimation of the initial list of $\{w_p\}$. More specifically, with $K_{max}=2$ coherent paths and P'=1 parameter $w_1$ detected, it is essential to apply the coherent MUSIC method of step B with $w_1=w_1$ and $w_2=w_1$ or the set of parameters $\{w_1, w_1\}$. In the case where $K_{max}=3$ coherent paths and P'=2, there are two configurations to which the 1D coherent MUSIC step B must be applied: $\{w_1, w_2, w_2\}$ and $\{w_1, w_1, w_2\}$. Consequently, when P'$<K_{max}$ the step B of the method can be applied several times. There are thus L sets of following incidences $w_p$ to which the step B of the method must be applied:

$$\Omega_i = \Psi \cup X_i \text{ for } (1 \leq i \leq L) \quad (39)$$

$$\text{with } \begin{cases} \Psi = \{w_p \text{ for } 1 \leq p \leq P'\} \\ X_i \subset \Psi \text{ and cardinal}(X_i) = K_{max} - P' \end{cases}$$

The number L and the sets $\Omega_i$ can be determined by a conventional arithmetical process.

The following steps of the method make it possible to estimate the direction of arrival of P paths in azimuth-elevation bearing in mind that there is at least one group of $K_{max}$ coherent paths and that the array is disturbed by mutual coupling of known matrix Z.

Step No. 1: Breakdown the covariance matrix $R_x=E[x(t)x(t)^H]$ into specific elements such that $$R_x = E\Lambda E^H$$

in which E is the matrix with the specific vectors and $\Lambda$ is a diagonal matrix consisting of the specific values.

Step No. 2: From the specific values of the matrix $\Lambda$, determination of the number K of dominant specific values giving the rank of $R_x$.

Step No. 3: Following breakdown of the matrix $R_x$ $$R_x = E_s \Lambda_s E_s^H + E_b \Lambda_b E_b^H \text{ with } \begin{cases} E = [E_s \ E_b] \\ \Lambda = \begin{bmatrix} \Lambda_s & 0 \\ 0 & \Lambda_b \end{bmatrix} \end{cases}$$

In which $E_s$ and $E_b$ are the matrices of the specific vectors respectively associated with the signal space bearing in mind that dim $(E_s)=N\times K$ and in which $\Lambda_s$ and $\Lambda_b$ are diagonal matrices respectively consisting of the specific values of the signal space and the specific values of the noise space.

Step No 4: Extraction of the non-noise-affected and coupling-free covariance matrix by performing $$R_y = Z^{-1}\left(R_x - \frac{\text{trace}(\Lambda_b)}{N-K}I_N\right)Z^{-1H}$$

In which K is the dimension of the signal space such that $K \leq P$.

Step No. 5: Calculation of the noise projector of the matrix $R_y$ in the following way:

$$\Pi_b = I_N - Z^{-1}(E_s(E_s^H Z^{-1H} Z^{-1} E_s)^{-1} E_s^H) Z^{-1H}$$

Step No. 6: Application of the 2D MUSIC algorithm with the criterion $J_{MUSIC}(\Theta)=(\hat{a}(\Theta)^H \Pi_b^H \hat{a}(\Theta))/(\hat{a}(\Theta)^H \hat{a}(\Theta))$ with the vector $\hat{a}(\Theta)$ of the equation (22). Estimation of $P_0 \leq K$ incidences $\Theta_p$ ($1 \leq p \leq P_0$) satisfying $J_{MUSIC}(\Theta_p)<\eta(1)$. Formation of the set $\overline{\Theta}=\{\Theta_1 \ldots \Theta_{P0}\}$ of the non-coherent paths. If $P_0<K$, go to step No. 7.

Step No. 7: Calculation of the covariance matrix of the linear array by performing $R_x^l = P_{roj} R_x P_{roj}^H$ bearing in mind that $x^l(t)=P_{roj}x(t)$.

Step No. 8: Application of one (or both) of the smoothing techniques to the matrix $R_x^l$ of the linear array by performing either $$\tilde{R}_x = \sum_{i=1}^{I} P^i R_x^l (P^i)^H$$

for smoothing or $\tilde{R}_x = R_x^l + \Pi(R_x^l)^* \Pi^T$ for the forward-backward.

Step No. 9: From a breakdown into specific elements of the matrix $\tilde{R}_x$, estimation of the rank P of the signal space and of the noise projector $\Pi_b^l = E_b E_b^H$ (step of the MUSIC algorithm reviewed in steps 1 to 3 of this method for the matrix $R_x$).

Step No. 10: Application of the 1D MUSIC algorithm with the criterion $J_{MUSIC}(w)=(a^l(w)^H \Pi_b^l a^l(w))/(a^l(w)^H a^l(w))$ with the vector $a^l(w)$ of the equation (28). Estimation of P incidences $w_p$ ($1 \leq p \leq P$) satisfying $J_{MUSIC}(w_p)<\eta$.

Step No. 11: Formation of the set $\Psi$ of the incidences $w_p$ associated with a coherent path such that $\Psi=\{w_p \neq \cos(\theta_i-\alpha)\cos(\Delta_i) \text{ in which } \Theta_i=\{\theta_i, \Delta_i\} \in \overline{\Theta}\}$ Step No. 12: If $\overline{P}>K$, then $K_{max}$=cardinal($\Psi$) and L=1 with $\Omega_1=\Psi$. Go to step No. 14.

Step No. 13: If $P \leq K$, then $K_{max}=K+1$ and formation of the L sets of parameters $\Omega_i$ of the equation (39) with P'=cardinal ($\Psi$).

Step No. 14: i=1

Step No. 15: Application of the 1D coherent MUSIC steps B and C described on page 18 with $\Theta=f(u)=\{f_1(u_1) \ldots f_{K_{max}}(u_{K_{max}})\}$, bearing in mind that $f_p(u)=f(\overline{u},(w_p-u\cos(\alpha))/\sin(\alpha))$ in which $w_p \in \Omega_i$. Obtaining of K$^i$ incidences $\Theta_k$ for ($1 \leq k \leq K^i$).

Step No. 16: For k ranging from 1 to K$^i$ if $\overline{\Theta}_k \notin \overline{\Theta}$ then $\overline{\Theta}= \overline{\Theta} \cup \{\overline{\Theta}_k\}$ Step No. 17: i=i+1. If i$\leq$L then return to step No. 14.

One advantage of the method according to the invention is that the minimum number of sensors for estimating the direction of arrival of K coherent paths in 2D is lower than with the methods of the prior art, which require a number of sensors greater than 2(K+1), the method according to the invention requiring only a number of sensors greater than K.

Another advantage of the method according to the invention is that it makes it possible to estimate directions of arrival of the paths in 2D with larger arrays, which enhances the accuracy of the estimation.

BIBLIOGRAPHY

[1] R O. SCHMIDT, *Multiple emitter location and signal parameter estimation*, in Proc of the RADC Spectrum Estimation Workshop, Griffiths Air Force Base, New York, 1979, pp. 243-258.

[2] P. Larzabal *Application du Maximum de vraisemblance au traitement d'antenne*: radio-goniométrie et poursuite de cibles. PhD Thesis, Université de Paris-sud, Orsay, FR, June 1992

[3] B. Ottersten, M. Viberg, P. Stoica and A. Nehorai, *Exact and large sample maximum likelihood techniques for parameter estimation and detection in array processing*. In S. Haykin, J. Litva and T J. Shephers editors, Radar Array Processing, chapter 4, pages 99-151. Springer-Verlag, Berlin 1993.

[4] A. FERREOL, E. BOYER, and P. LARZABAL, <<Low cost algorithm for some bearing estimation in presence of separable nuisance parameters>>, Electronic-Letters, IEE, vol 40, No. 15, pp 966-967, July 2004

[5] S. U. Pillai and B. H. Kwon, *Forward/backward spatial smoothing techniques for coherent signal identification*, IEEE Trans. Acoust., Speech and Signal Processing, vol. 37, pp. 8-15, Jan. 1988

[6] B. Friedlander and A. J. Weiss. *Direction Finding using spatial smoothing with interpolated arrays*. IEEE Transactions on Aerospace and Electronic Systems, Vol. 28, No. 2, pp. 574-587, 1992.

[7] A. Ferréol, J. Brugier and Ph. Morgand Method for estimating the angles of arrival of coherent sources by a spatial smoothing technique on any array of sensors. Patent published under the number FR 2917180.

The invention claimed is:

1. A method for jointly determining an azimuth angle $\theta$ and an elevation angle $\Delta$ of wave vectors of P waves in a system comprising an array of sensors, a number of waves out of the P waves being propagated along coherent or substantially coherent paths between a source and said array of sensors, the method comprising at least the following steps:
selecting a subset of sensors from said array of sensors to form a linear subarray of sensors;
applying, to signals from the linear subarray of sensors, an algorithm according to a single dimension to decorrelate sources of the P waves;
determining a first component w of said wave vectors by applying, to the signals observed from the linear subarray of sensors, a goniometry algorithm according to a single dimension w;
determining a second component u of said wave vectors by applying a goniometry algorithm according to a single dimension u to the signals from the entire array of sensors;
determining the azimuth angle $\theta$ and the elevation angle $\Delta$ from the first component w and the second component u.

2. The method as claimed in claim 1, wherein:
the linear subarray of sensors are chosen such that at least a portion of the linear subarray of sensors is unchanging by translation; and
a spatial smoothing algorithm is applied to decorrelate the sources of the P waves.

3. The method as claimed in claim 1, wherein:
the linear subarray of sensors are chosen such that at least a portion of the linear subarray of sensors includes a center of symmetry; and
a forward-backward algorithm is applied to decorrelate the sources of the P waves.

4. The method as claimed in claim 1, wherein the determined first component w of the wave vectors is a projection, on an axis formed by the linear subarray of sensors, of the wave vectors on a plane formed by the array of sensors.

5. The method as claimed in claim 1, further comprising at least the following steps:
calculating a covariance matrix $R_x$ on the entire array of sensors;
extracting from the covariance matrix $R_x$, a covariance matrix $R_x'$ corresponding to the linear subarray of sensors;
applying a source decorrelation algorithm to the covariance matrix $R_x'$;
estimating, for each path p, values of the first component $w_p = \cos(\theta_p - \alpha).\cos(\Delta_p)$ by applying a 1D goniometry algorithm to the decorrelated covariance matrix $R_x'$, $\alpha$ being an azimuth orientation angle of the axis formed by the linear subarray of sensors;
estimating values of the second component $u_p = \cos(\theta_p).\cos(\Delta_p)$, for each path p, by applying a 1D goniometry algorithm to the covariance matrix $R_x$; and
determining, from values of pairs $(w_p, u_p)$, values of azimuth-elevation pairs $(\theta_p, \Delta_p)$.

6. The method as claimed in claim 1, wherein the goniometry algorithm used to determine the first component w of each wave vector P is a MUSIC algorithm, the criterion $J_{MUSIC}$ to be minimized to determine said component w being equal to $$J_{MUSIC}(w) = \frac{a^l(w)^H \Pi_b^l a^l(w)}{a^l(w)^H a^l(w)},$$

in which $\Pi_b^l$ is a noise projector extracted from the decorrelated covariance matrix $R_x'$ corresponding to the linear subarray of sensors, and $a(w)^l$ represents a response of the linear subarray of sensors to the incident waves P.

7. The method as claimed in claim 1, wherein the goniometry algorithm used to determine the second component is a coherent MUSIC algorithm in a single dimension, the criterion to be minimized being:

$$J_{MUSIC coherent\ MUSIC}(\Theta) = \frac{\det(D(\Theta)^H \Pi_b D(\Theta))}{\det(D(\Theta)^H D(\Theta))}$$

in which $\underline{\Theta} = \{f_1(u_1) \ldots f_{K_{max}}(u_{K_{max}})\}$, with $$f_p(u) = f\left(u, \frac{w_p - u\cos(\alpha)}{\sin(\alpha)}\right),$$

$\alpha$ being the azimuth orientation angle of the axis formed by the linear subarray of sensors, $D(\Theta)$ being a vector equal to $[a(\underline{\Theta}_1) \ldots a(\underline{\Theta}_{Kmax})]$, $a(\underline{\Theta}_i)$ being the response of the array of sensors to the path of index i, $K_{max}$ being a maximum number of coherent paths.

8. The method as claimed in claim 1, wherein the goniometry algorithm used to determine the second component is a maximum likelihood algorithm.

9. The method as claimed in claim 5, wherein the array is disturbed by mutual coupling of a known matrix Z, further comprising a step for eliminating a coupling executed prior to the steps for estimating the values of the components w and u, said step for eliminating the coupling determining a covariance matrix that is cleaned of noise by applying the following processing to the covariance matrix: $Z^{-1}(R_x - \sigma^2 I)Z^{-H}$, $\sigma^2$ being an estimated noise level.

10. The method as claimed in claim 5, wherein the determination of the pairs of values $(\theta_p, \Delta_p)$ from the values of pairs $(w_p, u_p)$ is performed as follows:

$$\begin{cases} \theta_p = \text{angle}(u_p + jv_p) \\ \Delta_p = \cos^{-1}(|u_p + jv_p|) \end{cases}$$

in which $$v_p = \frac{w_p - u_p \cos(\alpha)}{\sin(\alpha)}.$$

* * * * *

UNITED STATES PATENT AND TRADEMARK OFFICE
CERTIFICATE OF CORRECTION

PATENT NO. : 8,669,901 B2  Page 1 of 1
APPLICATION NO. : 13/141968
DATED : March 11, 2014
INVENTOR(S) : Ferreol et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 394 days.

Signed and Sealed this
Twenty-ninth Day of September, 2015

Michelle K. Lee
*Director of the United States Patent and Trademark Office*